(12) United States Patent
Amsinck et al.

(10) Patent No.: US 10,008,029 B2
(45) Date of Patent: Jun. 26, 2018

(54) UPDATING DEPTH RELATED GRAPHICS DATA

(71) Applicant: Nvidia Corporation, Santa Clara, CA (US)

(72) Inventors: Christian Amsinck, Cary, NC (US); Eric B. Lum, San Jose, CA (US); Barry Rodgers, Madison, AL (US); Tony Louca, Raleigh, NC (US); Christian Rouet, San Francisco, CA (US); Jonathan Dunaisky, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 397 days.

(21) Appl. No.: 13/907,711

(22) Filed: May 31, 2013

(65) Prior Publication Data

US 2014/0354634 A1 Dec. 4, 2014

(51) Int. Cl.
*G06T 15/40* (2011.01)

(52) U.S. Cl.
CPC .................................. *G06T 15/405* (2013.01)

(58) Field of Classification Search
None
See application file for complete search history.

(56) References Cited

U.S. PATENT DOCUMENTS

| | | | |
|---|---|---|---|
| 4,958,305 A | 9/1990 | Piazza | |
| 5,043,921 A | 8/1991 | Gonzalez-Lopez et al. | |
| 5,369,741 A | 11/1994 | Hartog et al. | |
| 5,583,974 A | 12/1996 | Winner et al. | |
| 5,596,686 A | 1/1997 | Duluk, Jr. | |
| 5,694,143 A | 12/1997 | Fielder et al. | |
| 5,751,291 A | 5/1998 | Olsen et al. | |
| 5,761,400 A | 6/1998 | Derby et al. | |
| 5,909,595 A | 6/1999 | Rosenthal et al. | |
| 5,914,721 A | 6/1999 | Lim | |
| 5,990,904 A | 11/1999 | Griffin | |
| 6,046,746 A | 4/2000 | Deering | |
| 6,052,128 A | 4/2000 | Narayanaswami et al. | |
| 6,052,129 A | 4/2000 | Fowler et al. | |
| 6,091,428 A | 7/2000 | Piazza et al. | |
| 6,094,200 A | 7/2000 | Olsen et al. | |
| 6,172,670 B1 | 1/2001 | Oka et al. | |
| 6,246,415 B1 | 6/2001 | Grossman et al. | |
| 6,323,860 B1 | 11/2001 | Zhu et al. | |
| 6,373,485 B2 | 4/2002 | Sowizral et al. | |
| 6,407,741 B1 | 6/2002 | Morein et al. | |
| 6,445,390 B1 | 9/2002 | Aftosmis et al. | |
| 6,476,807 B1 | 11/2002 | Duluk, Jr. et al. | |

(Continued)

*Primary Examiner* — Kyle Zhai (57) ABSTRACT

Updating depth related graphics data is described. Geometric primitives are processed. Pixels are generated from the primitives based on the processing, each of which has at least one corresponding depth value. Culling is performed on a first group of the pixels, based on a representation of the at least one depth related value corresponding to each. Pixels may be discarded based on the culling and upon which a second group of pixels remain. A depth related raster operations function is performed, in which data is transacted with a depth buffer. The culling function is updated in relation to the transacting. The updating is performed on the basis of a granularity, which characterizes the culling function.

16 Claims, 4 Drawing Sheets

(56) References Cited

U.S. PATENT DOCUMENTS

| | | |
|---|---|---|
| 6,480,205 B1 | 11/2002 | Greene et al. |
| 6,525,726 B1 | 2/2003 | Xie et al. |
| 6,630,933 B1 | 10/2003 | Van Hook |
| 6,636,212 B1 | 10/2003 | Zhu |
| 6,636,215 B1 | 10/2003 | Greene |
| 6,646,639 B1 | 11/2003 | Greene et al. |
| 6,677,945 B2 | 1/2004 | Lapidous et al. |
| 6,717,576 B1 | 4/2004 | Duluk, Jr. et al. |
| 6,720,964 B1 | 4/2004 | Fowler et al. |
| 6,862,025 B2 | 3/2005 | Buehler |
| 6,900,800 B2 | 5/2005 | Baldwin |
| 6,924,801 B1 | 8/2005 | Dorbie |
| 7,023,437 B1 | 4/2006 | Voorhies et al. |
| 7,030,877 B1 | 4/2006 | Sell |
| 7,061,507 B1 * | 6/2006 | Tuomi et al. ............... 345/611 |
| 7,068,272 B1 | 6/2006 | Voorhies et al. |
| 7,091,971 B2 | 8/2006 | Morein |
| 7,218,317 B2 | 5/2007 | Liao et al. |
| 7,221,368 B1 | 5/2007 | Crow et al. |
| 7,242,400 B2 | 7/2007 | Van Hook et al. |
| 7,292,242 B1 | 11/2007 | Wittenbrink et al. |
| 7,755,624 B1 * | 7/2010 | Hakura et al. ............... 345/421 |
| 7,995,056 B1 | 8/2011 | Voorhies |
| 8,269,769 B1 | 9/2012 | Voorhies et al. |
| 8,390,619 B1 | 3/2013 | Voorhies et al. |
| 8,692,844 B1 | 4/2014 | Molnar et al. |
| 8,854,364 B1 | 10/2014 | Voorhies |
| 8,933,933 B2 | 1/2015 | French et al. |

\* cited by examiner

Example Computer Apparatus 400

Fig. 4

UPDATING DEPTH RELATED GRAPHICS DATA

TECHNOLOGY

Embodiments of the present invention relate generally to graphics processing. More particularly, an example embodiment of the present invention relates to updating depth related graphics data.

BACKGROUND

Modern computers may function with a graphical processing unit (GPU) to efficiently and quickly compute images and graphics. GPUs may function with a graphics rendering engine, which typically comprises multiple specialized processing engines organized in a dataflow-style pipeline. GPUs may also function with significant local memory resources, which may include a frame buffer.

The processing power and speed GPUs provide allow fast, efficient computation of two dimensional (2D) and three dimensional (3D) graphics, such as for video games. Moreover, their capabilities find application in other fields for high speed analysis of high volume medical, technical and geographic imaging information and financial, statistical and scientific data and for mathematical processing.

GPUs function to render graphical features spatially in a display scene based on geometrically primitive 2D polygons such as triangles. More complex scene features such as 3D objects are rendered as connected combinations of the 2D primitives.

3D graphics present an illusion of depth with a 2D display. Based on a perspective related to a vantage point of a viewer of the scene or a capturer thereof such as a camera, the rendering engine determines whether a feature of an object in the scene is occluded or obstructed by a feature of another scene object. For example, an image may have a foreground object that partially covers a background object.

Each pixel of each primitive, and thus or each image object or feature, in a 3D scene corresponds to a planar spatial 2D horizontal, vertical location, such as an 'x,y' value in a Cartesian coordinate system. Further, each pixel has a depth related 'z' value. A GPU may thus sort each object by increasing distance from an apparent or virtual remote vanishing point in the scene.

Processing speed may be increased by z buffering, in which the z value is stored in a depth buffer (z buffer) in association with each pixel on the surface of the objects in the image. The z values for pixels to be represented as closer to the vantage point are lower than the z values for pixels to be represented as farther therefrom, which are correspondingly higher.

In rendering graphics, each pixel is rasterized to determine coverage associated with each geometric primitive. Rasterizing may store (write) the z-value to and retrieve (read) the z-values from the Z-Buffer. However, latency may be reduced and resources conserved, e.g., in rasterizing and/or expensive subsequent operations such as shading, by early culling of primitives with z-values known to be bad. Thus, rasterizing may keep a local, lazily updated, conservative approximation (e.g., an approximate but conservative representation) of the Z-Buffer for fast local reference to cull primitives with particular z-values for early discard. Similarly, it may also be advantageous for the same approximate Z buffer to communicate an unambiguous acceptance of render geometry, in order to save the work required to do more exact visibility testing later.

Storage resources such as memory allocated to the approximate instance of the depth buffer kept locally to rasterization functions are limited in relation to the actual Z-Buffer. For example, the Z-Buffer has sufficient storage resources to support a format corresponding to the high granularity active anti-aliasing sampling mode of the surfaces being processed. However, the rasterizing-local approximate instance of the Z-Buffer may only have storage resources that suffice to support a pixel based granularity, which may be more coarse-grained than the finer-grained anti-aliasing sampling granularity.

At higher level anti-aliasing sample settings, the sample-based granularity of conventional z-culling updates (e.g., from a z-raster operations function) may exceed a constraint on the buffer, with which the lazy updates to the local Z-Buffer approximation may be stored. The extra data that correspond to the higher granularity anti-aliasing samples are thus discarded, which wastes the data and the resources with which it was gathered and processed earlier. At low level anti-aliasing settings on the other hand, the granularity of a conventional z-culling update to the local Z-Buffer approximation is coarser than the capacity that may be accommodated by the local buffer. This can reduce the fidelity of the compression that could otherwise be attained.

Approaches described in this section could, but have not necessarily been conceived or pursued previously. Unless otherwise indicated, neither approaches described in this section, nor issues identified in relation thereto are to be assumed as recognized in any prior art merely by inclusion therein.

SUMMARY

Updating depth related graphics data is described. Geometric primitives are processed. Pixels are generated from the primitives based on the processing, each of which has at least one corresponding depth value. Culling is performed on a first group of the pixels, based on a representation of the at least one depth related value corresponding to each. Pixels may be discarded based on the culling and upon which a second group of pixels remain. A depth related raster operations function is performed, in which data is transacted with a depth buffer. The culling function is updated in relation to the transacting. The updating is performed on the basis of a granularity, which characterizes the culling function.

BRIEF DESCRIPTION OF THE DRAWINGS

The accompanying drawings below comprise a part of the specification herein of example embodiments of the present invention and are used for explaining features, elements and attributes thereof. Principles of example embodiments are described herein in relation to each figure of these drawings, in which like numbers are used to reference like items, and in which.

DESCRIPTION OF EXAMPLE EMBODIMENTS

Overview

Example embodiments of the present invention are described herein in the context of and in relation to updating depth related graphics data. Reference will now be made in detail to implementations of the example embodiments as illustrated in the accompanying drawings. It should be appreciated by artisans of ordinary skill in technologies that relate to graphics processing however, that the present invention may be practiced without some of these specifically described details.

For focus, clarity and brevity, as well as to avoid unnecessarily occluding, obscuring, obstructing or obfuscating features that may be somewhat more germane to, or significant in explaining example embodiments of the present invention, this description may avoid describing some well-known processes, structures, components and devices in exhaustive detail. Ordinarily skilled artisans in these technologies should realize that the following description is made for purposes of explanation and illustration and is not intended to be limiting in any way and other embodiments should readily suggest themselves to such artisans in relation to the features and corresponding benefit of this disclosure.

An example embodiment of the present invention is described in relation to rendering graphics data, including updating depth related graphics data. Geometric primitives are processed. Pixels are generated from the primitives based on the processing, each of which has at least one corresponding depth value. Culling is performed on a first group of the pixels, based on a representation of the at least one depth related value corresponding to each. Pixels may be discarded based on the culling and upon which a second group of pixels remain. A depth related raster operations function is performed, in which data is transacted with a depth buffer. The culling function is updated in relation to the transacting. The updating is performed on the basis of a granularity, which characterizes the culling function.

Example Graphics Rendering Pipeline

Figure 1:
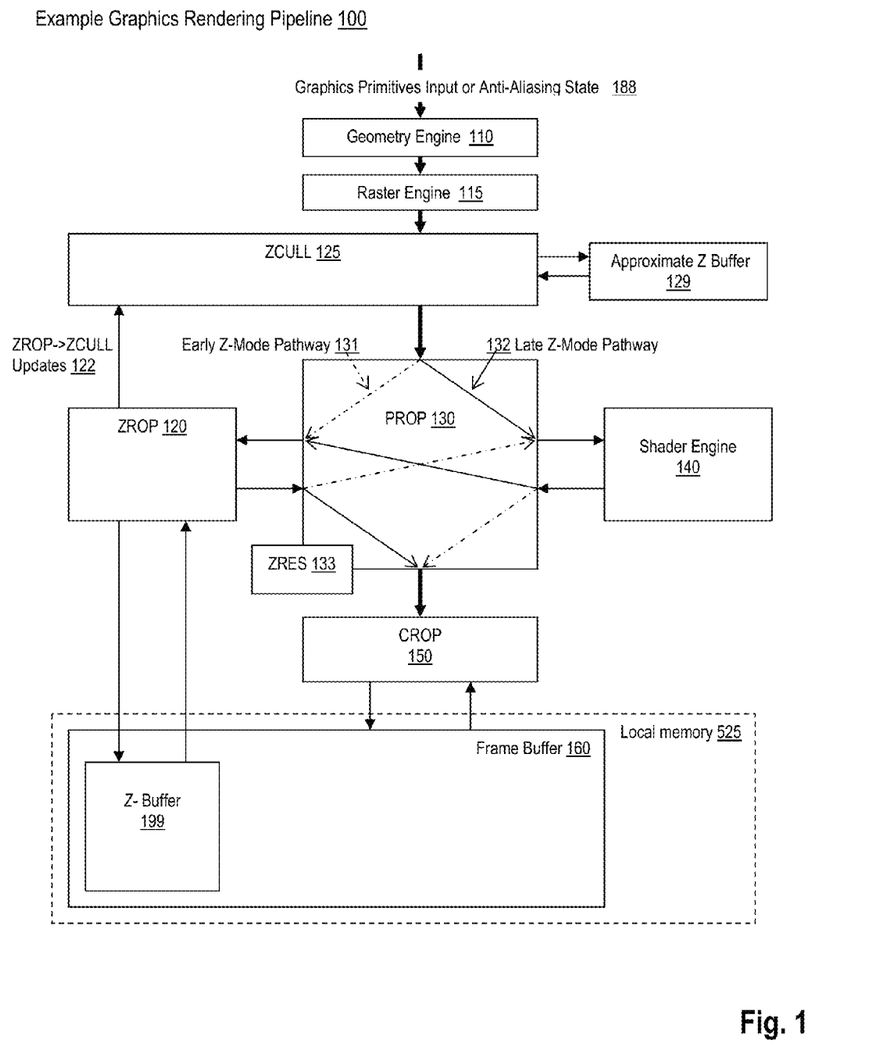
FIG. 1 depicts an example graphics rendering pipeline, according to an embodiment of the present invention.

FIG. 1 depicts a data flow through an example graphics rendering pipeline 100, according to an embodiment of the invention. A geometry engine 110 (also referred to interchangeably and synonymously herein as a set-up engine) receives geometric primitives 188 from a driver executing on a graphics processor (e.g., GPU 520; FIG. 5). The geometric primitives 188 may also (or alternatively) comprise anti-aliasing state information related to a surface thereof. The geometry (setup) engine 110 operates on the incoming primitives 188 and performs transformations over them. The transformed (e.g., simplified) geometric primitives are suitable for further processing in a raster engine 115, which rasterizes the transformed geometric primitives for further processing in the rendering pipeline 100.

The setup engine 110 also operates on incoming commands containing state bundles. A state bundle comprises data that defines, without limitation, how subsequent graphics primitives are to be processed in the various processing units of the graphics rendering pipeline 100. State bundle data may be retained in those processing units for later reference.

An example embodiment may be implemented wherein the state bundle data comprises active anti-aliasing data 188. The anti-aliasing data 188 relate to an anti-aliasing mode, which is based on surface attributes of the geometric primitives and relates to the granularity with which the surface attributes are sampled.

The setup engine 110 tracks the rendering state in the graphics rendering pipeline 100 and coordinates certain changes therein. The rendering state includes, without limitation, the different variables, modes and settings associated with the rendering process at various points within the graphics rendering pipeline 100. Some rendering state variables, modes or settings are established prior to initiating the rendering process on a given primitive, whereas some rendering state is dynamically updated as the primitives progress through the graphics rendering pipeline 100.

GPUs function to render graphical features spatially in a display scene based on geometrically primitive 2D polygons such as triangles. More complex scene features such as 3D objects are rendered as connected combinations of the 2D primitives. Thus, set-up (geometry) engine 110 computes tessellations or triangulations, based on spatial information that corresponds to each corner of each of the 2D primitives in a 3D scene.

The spatial data may relate to a Cartesian coordinate system, in which width data is represented as values on an x orientation (e.g., axis), height data is represented as values on a y axis and as described below, depth data as values on a z axis. Set-up engine 110 outputs the spatial data to a rendering (e.g., raster, rasterizing) engine or "rasterizer" 115.

The raster engine 115 computes the coverage of the geometric primitives and generates pixel primitives for further or subsequent processing, e.g., shading (140). Additionally, the raster engine 115 may compute the associated Z-value for each pixel, which may be stored in a depth or 'Z' buffer 199. An example embodiment may be implemented wherein the Z-Buffer 199 comprises a logical or physical instance, component, feature, portion or element of a frame buffer 160. The frame buffer 160 may comprise a logical or physical instance, component, feature, portion or element of a memory (e.g., local memory 525; FIG. 5) disposed locally in relation to a GPU (e.g., GPU 500; FIG. 5).

The further or subsequent processing may comprise shading or an operation or function of a shader engine 140. Functions or processes of shader engine 140 may be quite complex and consume significant power and computational resources. Awaiting shading computation outputs may thus add latency to (e.g., bottlenecking in) the graphics rendering pipeline 100. Early Z-culling (ZCULL), using an approximate Z-Buffer instance associated therewith, may thus improve graphics rendering pipeline performance. An example embodiment may be implemented wherein primitives, which are determined to be occluded or obstructed or otherwise not visible based on an early ZCULL 125 decision, are discarded accordingly, e.g., prior to initiating computations of shader 140 therewith.

ZCULL function 125 thus computes an early culling operation over depth related data. The depth related data of a new pixel (and, e.g., stencil data related thereto) is stored with an approximate Z-Buffer instance 129. The approximate Z-Buffer instance 129 comprises a conservative approximation (e.g., an approximate but conservative representation) of existing depth (and stencil) data in Z-Buffer 199. The approximate Z-Buffer instance 129 comprises physical and/or logical memory resources local or proximate to or part of ZCULL 125. The approximate Z-Buffer instance 129 thus comprises a lazily updated, yet conservative logical approximation of the Z-Buffer 199, which ZCULL 125 uses for early discard or acceptance of pixels from render engine 115. The approximate Z-Buffer instance 129 thus represents a local, lower resolution instance of the existing z-values, as-stored at a higher resolution in a current instance of the Z-buffer 199.

An example embodiment may be implemented wherein ZCULL 125 is updated by a Z-Raster operations (ZROP) function 120 in relation to the Z-Buffer 199. Thus, when ZROP 120 reads the z-value of a pixel from, or write the z-value of a pixel to the Z-Buffer 199, it provides a ZROP-to-ZCULL update 122 in relation to Z-Buffer 199. ZCULL 125 applies the ZROP-to-ZCULL update 122 in a corresponding update to the approximate Z-Buffer instance 129.

In updating ZCULL 125, an example embodiment of the present invention, ZROP 120 matches a pixel-based granularity used internally or natively by ZCULL 125 and its local approximate Z-Buffer instance 129. Thus, an example embodiment may be implemented wherein ZCULL 125 functions with a surface of higher fidelity than could be achieved with a conventional approach. For example, conventional approaches based on anti-aliasing granularities associated with surfaces undergoing processing would discard the "extra" data, e.g., associated with the higher granularities. Or for example, conventional approaches based on anti-aliasing granularities associated with surfaces undergoing processing would compress data with lower fidelity than its potential may otherwise allow.

Prior to rendering a given pixel, it is tested for visibility, wherein the pixel's z value is compared to the z values of all pixels along a line segment that extends from the closest point in the image to the vantage point, through all layers of the objects and features in the image, to the pixel deepest in the scene. In relation to the line segment, the pixel with the lowest z value "survives" Z-testing and is rendered exclusively for display. Pixels that fail to survive Z-testing are discarded. The raster engine 115 rasterizes each pixel to determine coverage associated with each geometric primitive, to output a sequence of unshaded pixel primitives. Each of the primitives has an associated z value stored in the z buffer.

An example embodiment may be implemented wherein the ZROP engine 120 computes the Z-testing, wherein Z-values for the current pixel primitives are compared to earlier Z-values, which were previously stored in Z-buffer 199, for the corresponding pixel locations. For example, the ZROP engine 120 compares the Z-value of each pixel with the earlier Z-value of the corresponding pixel location previously stored in the depth buffer 199. The Z-testing results from the ZROP engine 120 determine if the various pixel primitives are to be kept or discarded.

If the current pixel passes Z-testing, then the ZROP engine 120 may write the Z-value of the pixel to the depth buffer 199. However, if the pixel does not pass Z-testing, then the pixel is discarded by a Z-resolve (ZRES) engine 133. In the event of a Z-test failure therefore, the ZROP engine 120 does not write any Z-value information to the depth buffer. An example embodiment may be implemented wherein the ZRES 133 comprises a logical or physical instance, component, element or feature of a pre-raster operations (PROP) unit 130.

In addition to the Z-values that determine the visibility of a pixel, an example embodiment may be implemented wherein stencil values are used in conjunction with Z-values to initiate or finalize a determination as to whether a particular pixel passes or fails Z-testing. As used herein, the terms 'Z-values' and 'Z-testing' may thus relate to Z-values and/or to Z-values which, where appropriate, include or reference stencil values.

The shader engine 140 operates on the pixel primitives to compute, without limitation, color and Z-values for the pixels, as determined by the programming of the shader engine 140. A color raster operations (CROP) engine 150 writes, as determined by the results of Z-testing in the ZROP engine 120, the color value of each passing pixel to the frame buffer 160.

The PROP unit 130 manages the flow of pixel primitives between the ZROP engine 120, the CROP engine 150 and the shader engine 140, sequencing the order of operations according to the state of the Z-mode flag included within each work transaction. The PROP unit 130 directs data within discrete work transactions along one of two processing pathways, corresponding to a late Z-mode processing model 131 and an early Z-mode processing model 132.

The data flow path 132 for late Z-mode is shown in solid lines running through the PROP unit 130. In late Z-mode, the shader engine 140 first operates on a pixel primitive to calculate, without limitation, color and Z-values for the related pixel. The shader engine 140 directs the results to the ZROP engine 120 for Z-testing. The ZROP engine 120 updates the Z-values in the depth buffer 199 for all pixels passing the Z-test and forwards these data to the ZRES engine 133 within the PROP unit 130. The ZRES engine 133 discards all pixels that do not pass the Z-test and transmits the passing pixels to the CROP engine 150 for any remaining color and other updates for frame buffer 160.

In many instances, the Z-values are not altered by the shader engine 140. In the early Z-mode path 131, Z-testing is conducted before shading, which relieves the shader engine 140 from computational taskings associated with processing pixels that either have Z-values that are not altered by shading operations, or which are destined to be discarded through Z-test failure. The data flow path 131 for early Z-mode is shown in unevenly dashed lines running through the PROP unit 130. Thus, PROP 130 routes pixel primitives from the raster engine 115 to the ZROP engine 120 for Z-testing and to the ZRES engine 133 within the PROP unit 130 before routing to the shader engine 140.

Using the results of the Z-test, the ZRES engine 133 discards any and all pixels that do not pass the Z-test and then transmits the passing pixels to the shader engine 140 for shading operations. Importantly, since the shader engine 140 processes only pixels that survive Z-testing, the number of pixels processed in early Z-mode may be substantially reduced relative to the number of pixels processed in late Z-mode. After shading, the shader engine 140 transmits the shaded pixels to the CROP engine 150.

Whether a pixel primitive traverses the early Z-mode path or the late Z-mode path, an example embodiment may be implemented wherein Z-testing is performed on all pixels. Early Z-mode relieves the shader engine 140 of computation tasks associated with pixels that are discarded on account of Z-test failure, which may improve performance. With late Z-mode, the shader engine 140 shades all pixels, independent of an ultimate disposition of each pixel. Late Z-mode accommodates all rendering states available in the graphics rendering pipeline 100. Early Z-mode may be performed in certain frequently encountered rendering states and may be selected, e.g., opportunistically, when eligible primitives are to be rendered.

The Z-mode flag within each work transaction directs the flow of the work transaction, and the data included therein, through the PROP unit 130. The data flow path 132 for late Z-mode is shown in solid lines. For a late Z-mode work transaction including pixel data, the PROP unit 130 routes the pixel data from the raster engine 115 through a multiplexer 221 to the shader engine 140. The return data from the shader engine 140 is then sent through a multiplexer 220. The output of multiplexer is routed to the ZROP engine 120 for Z-testing and to latency buffer to accommodate the variable latency potentially exhibited by the ZROP engine 120.

The ZRES engine 214 merges the results of the Z-testing performed by the ZROP engine 120 with the data passed through the latency buffer 212 to transmit or discard each shaded pixel. The shaded pixels that pass the Z-test are then selected by a multiplexer 222 and transmitted to the CROP engine 150 for final color processing, before being written to the frame buffer 160.

For an early Z-mode work transaction, an example embodiment may be implemented wherein the PROP unit 130 routes data from the raster engine 115 directly to a multiplexer, which also multiplexes late Z-mode data. The data transmitted by the multiplexer is routed to the ZROP engine 120 and to a latency buffer, which accommodates the variable latency that may characterize a function of the ZROP engine 120 during Z-testing.

The ZRES engine 214 merges the results of the Z-testing performed by the ZROP engine 120 with data in the latency buffer and transmits the pixels that pass the Z-test to the shader engine 140 for shading. The shaded pixels are then routed from the shader engine 140, e.g., through another multiplexer, to the CROP engine 150 for final color processing, before being written to the frame buffer 160.

An example embodiment may be implemented wherein data flow through the PROP 130 is controlled, e.g., with a fork and join structure. When alternating between early Z-mode and late Z-mode, the results from a given processing engine within the graphics rendering pipeline 100 may be transmitted to one of two different downstream processing engines, depending on the mode of operation. Data from one processing element may be transmitted to two different processing elements, which thus forms a data fork. Not dissimilarly, data from two different processing elements may be received by and joined in a single processing element.

An example embodiment may thus be implemented wherein a source of the fork data transmits the data to two processing engines of pipeline 100. The fork data source may process incoming data, which may be structured as a sequence of work transactions. A set of related work transactions forms a packet. Each packet comprises at least an initial and a final work transaction. Graphics primitives may be transported between functional units within the graphics rendering pipeline 100 using the work transactions and packets.

A first of the processing engines of pipeline 100 may transmit results of its completed processing to a first elasticity buffer, which may hold the data for short spans of time prior to the data entering a join multiplexer. A second of the processing engines transmits its completed processing results to a second elasticity buffer, where data may be held for short spans of time prior to entering the join multiplexer.

The join multiplexer selects data from the first or the second of the elasticity buffers. The selected data may then be transmitted to a data sink. The join multiplexer thus stalls one elasticity buffer while accepting data from the other elasticity buffer. An example embodiment may also be implemented using another flow control mechanism to govern the data movement within the different fork and join structures present in the PROP 130.

The join multiplexer continues to select data from one source until the last work transaction for that packet is received, which preserves the contiguous flow of work transactions that form a packet. For example, if the join multiplexer is receiving a packet through the second elasticity buffer, then the join multiplexer awaits completion of the last work transaction of that packet before receiving data from the first elasticity buffer.

Thus, the join multiplexer effectively stalls the first elasticity buffer until the last work transaction of the packet from the second elasticity buffer is received. Once the last work transaction is received through the second elasticity buffer, the join multiplexer may select the first elasticity buffer for its input, which thus effectively stalls the second elasticity buffer and receives a packet from the first elasticity buffer. Once the join multiplexer begins to receive the packet from the first elasticity buffer, the last work transaction that packet should be received before the join multiplexer switches again to receiving work transactions from the second elasticity buffer.

Example Graphics Rendering Process

In an example embodiment, ZCULL 125 implements a lazy logical approximation of Z-buffer 199, which is used for early rejection and discard, and acceptance of render geometry. ZROP 120 may write to the Z-Buffer 199 or read data therefrom. In an example embodiment, ZROP 120 provides updates to ZCULL 125 upon writing to, or reading from the Z-Buffer 199. ZCULL 125 keeps a conservative approximation 129 of the Z-Buffer 199 stored locally, e.g., proximally, in relation to itself. An example embodiment may be implemented wherein the conservative, approximate Z-Buffer 129 comprises a logical instance of the Z-Buffer 199 with a sampling and/or storage granularity that is less than that of the actual Z-Buffer 199.

For example, the ZCULL-local Z-Buffer approximation may comprise a conservative representation of data stored in the actual Z-Buffer 199. ZCULL 125 uses data stored in the ZCULL-local approximate Z-Buffer instance 129 of the actual Z-Buffer 199 in performing its Z-culling functionality within graphics rendering pipeline 100.

Updating ZCULL 125 using the granularity setting it shares internally with its local approximate Z-Buffer instance 129 may improve performance, such as when data relating to Z-values stored therewith are updated. In an example embodiment, the anti-aliasing data 188 are supplied to ZCULL 125 and to ZROP 120.

In an example embodiment, the anti-aliasing data 188 relate to an anti-aliasing mode, which is based on surface attributes of the geometric primitives and relates to the granularity with which their surface attributes are sampled. Thus, an example embodiment may be implemented wherein ZROP 120 matches a granularity setting for ZCULL 125 and it local approximate Z-Buffer instance 129. This ties the granularity of the ZCULL 125 update packets to a pixel based mode, instead of a mode based on anti-aliasing samples (which may have granularities different from those of ZCULL 125).

ZROP 120 functions to write z-values to the actual Z-Buffer 199. For example, if a pixel survives Z-testing in the ZROP unit and is written to the depth buffer, then ZCULL updates the new pixel's depth (and stencil) data in its approximate Z-buffer. Pixels that fail to survive Z-testing are discarded. In a sense, ZCULL thus effectively represents a lazy update of a logical Z-buffer approximation, which may be used for early acceptance or rejection of a pixel's render geometry.

A Z-resolve engine ZRES 133 merges the results of Z-testing with latency buffered data corresponding to the associated pixel. The ZRES engine 133 transmits pixels that pass the Z-test to a color raster operations (CROP) engine 150. The CROP engine 150 updates and writes the new pixel's color data to the current color buffer.

The graphics rendering pipeline processing may be sequenced to accommodate the simplest reduction of sequential data dependence therein. Thus for example, a triangle primitive may be rasterized into a pixel primitive prior to conducting pixel operations over the set of pixels covered by the triangle. As a pixel's Z-value is computed prior to its comparison to previously computed Z-values in the depth buffer 199 (and as, in some modes, the shader may compute the Z-values), Z-testing after shading allows pixel or sample kills that result from other functions (e.g., alpha testing, alpha-to-coverage operations, and shader-pixel-kill operations) to occur prior to an update to the Z-Buffer 199.

The color values and other data relating to the pixels to be rendered for display are stored in a frame buffer, which may comprise a component of the high speed local memory with which the GPU functions. The Z-Buffer 199 may comprise a component of the frame buffer 160.

Processes associated with the shader engine 140 may be quite complex and consume significant power and computational resources. Awaiting shading computation outputs may thus add latency to (e.g., bottlenecking in) the graphics rendering pipeline. Early Z-culling functions, e.g., wherein ZCULL 125 functions with rasterizer 115, may thus improve graphics rendering pipeline 100 performance by discarding primitives known to be occluded or obstructed prior to initiating shader computation related thereto. An example embodiment of the present invention allows early ZCULL 125 functionality based on its own pixel-based format, which yields higher fidelity surfaces therein and improves its pixel culling efficiency and power usage.

Figure 2:
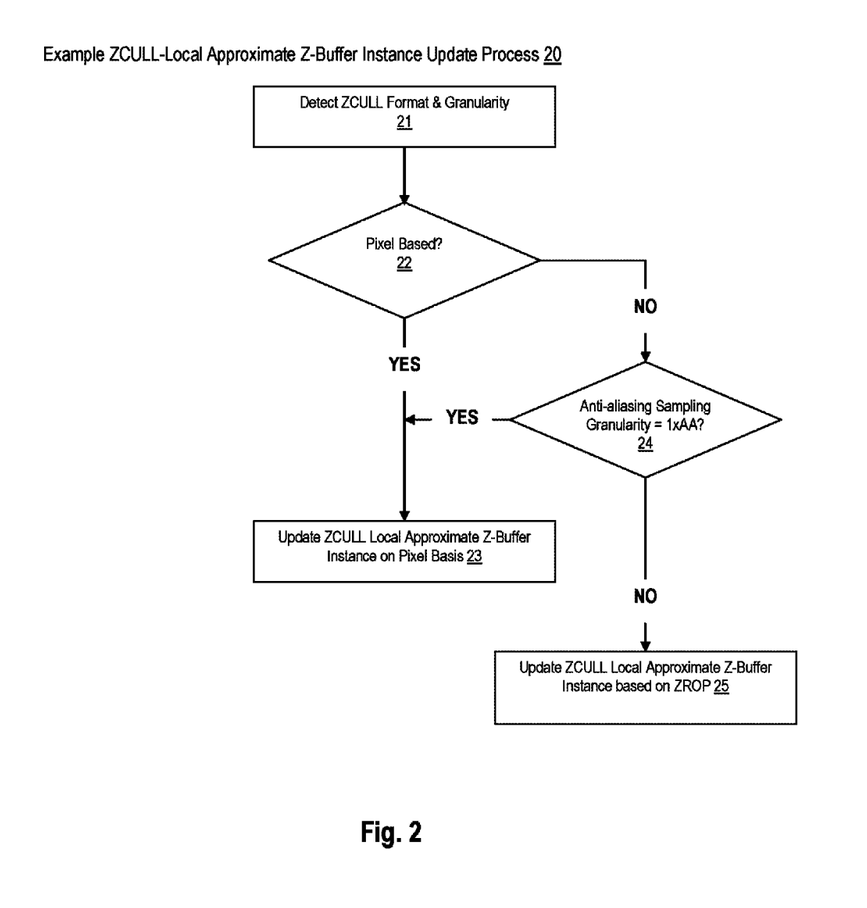
FIG. 2 depicts a flowchart for an example GPU-implemented graphics rendering process, according to an embodiment of the present invention.

FIG. 2 depicts a flowchart for an example GPU-implemented graphics rendering process 20, according to an embodiment of the present invention. A detection 21 is computed in ZROP 125 as to the format and/or granularity used by ZCULL 125 internally, e.g., for updating ZCULL's local approximate Z-Buffer instance 129.

Based on the detected format, a determination 22 is computed as to whether the format used internally by ZCULL 125 comprises a pixel based format. If so, then ZROP 120 performs updates 23 on ZCULL 125 based on the pixel based format used internally therewith, e.g., and with its local approximate Z-Buffer instance 129.

If the determination 22 is that the ZCULL 125 format is other than pixel-based, then a determination 24 is made, as to whether the sampling and/or storage granularity with which ZCULL 125 functions internally, e.g., to update its local approximate Z-Buffer instance 129, matches an anti-aliasing sampling granularity of one sample per pixel (e.g., "aliased," not anti-aliased, '1×AA'). If so, then ZROP 120 performs updates 23 on ZCULL 125 based on the 1×AA anti-aliasing granularity, which matches that of a pixel based format on a one-to-one basis. If not, then an example embodiment may be implemented wherein ZROP 125 applies an update 25 to ZCULL 125 in whatever mode and/or at whatever granularity ZROP 125 may function. Other example embodiments may use a more complex process, aimed at further optimizing the match between the ZROP 120-to-ZCULL update 122 granularity and the ZCULL 125 internal granularity.

In an example embodiment, ZROP 120 thus functions to match the granularity used with ZCULL 125 internally, e.g., in its control and address based transactions with its local approximate Z-Buffer instance 129. In a typical example circumstance for example, the ZCULL-local Z-Buffer 129 may be characterized wherein its format comprises a pixel-based format and wherein its granularity corresponds to a '1×AA' anti-aliasing (AA) setting, in which each pixel comprises a single, e.g., complimentary and/or corresponding, anti-aliasing sample.

Data relating to a value that represents the 'pixel based' attribute of the ZCULL-local Z-Buffer instance 129, and/or data relating to a value that represents a corresponding '1×AA' anti-aliasing setting is provided to ZCULL 125 for updating its local Z-Buffer instance 129.

ZROP 120 updates, programs or configures ZCULL 125 based on data processed in relation to its pixel-based processing and/or its granularity, which matches the pixel-based granularity on the one-to-one (1:1) pixel-to-anti-aliasing setting correspondence and/or complimentarity.

In accordance with an example embodiment, thus allowing ZROP 120 to match the granularity and/or format that ZCULL 125 uses internally or natively with its transactions with its local Z-Buffer instance 129, a surface may be reliably generated in ZCULL 125 with, e.g., at, a significantly high fidelity. Improving the fidelity of surfaces generated in ZCULL 125 may also improve culling efficiency and performance. Moreover, an example embodiment conserves resources related to power and processing of transactions and data discards, as data that can actually be used by ZCULL 125 with its local Z-Buffer instance 129 is sent.

The pixel based format comprises a normal or native format for ZCULL 125 and its local Z-Buffer instance 129. The 1×AA anti-aliasing sampling granularity matches the granularity of the pixel based format, is not an uncommon or atypical anti-aliasing sampling granularity in pipeline 100 (FIG. 1). In view of the commonality or likelihood of occurrence of the example circumstances described in relation to the present example, an example embodiment may thus be implemented with efficient, simple and minimal resources. An example embodiment may be implemented wherein the pixel-complementary 1×AA anti-aliasing granularity setting comprises a default or native setting for ZCULL 125 and its local approximate Z-Buffer instance 129.

An example embodiment may be implemented wherein a GPU performs an anti-aliasing function. GPUs may use an anti-aliasing filter to restrict signal bandwidth, so as to satisfy the Nyquist sampling theorem. Over-sampling may be used to increase anti-aliasing performance. Spatial anti-aliasing reduces distorting aliasing artifacts to allow representation of high-resolution images at lower resolutions.

Spatial anti-aliasing essentially smoothes signal components with spatial frequencies that exceed those which may be not be displayed without distortion. Without anti-aliasing, such distortion may otherwise appear as "jaggies" or other artifacts at areas of high spatial frequency, such as edge features in an image, which may be displayed and perceived as jagged, rather than smooth.

Sub-pixel rendering may allow color-balanced anti-aliasing and individual sub-pixels may be addressed as if they were actual pixels. Pixel geometry may be significant to both. To economically store sub-pixel data, 16 extra bits stored over a 4×4 array may be used per pixel. An example embodiment may be implemented that uses two or more full sub-pixels for each full pixel. Complete color and Z related data is included for each sub-pixel. Alternatively, the z value of a given pixel stored in the actual Z buffer 199, or the ZCULL-local approximate Z-Buffer instance 129, may be common to each of the sub-pixels associated therewith.

Figure 3:
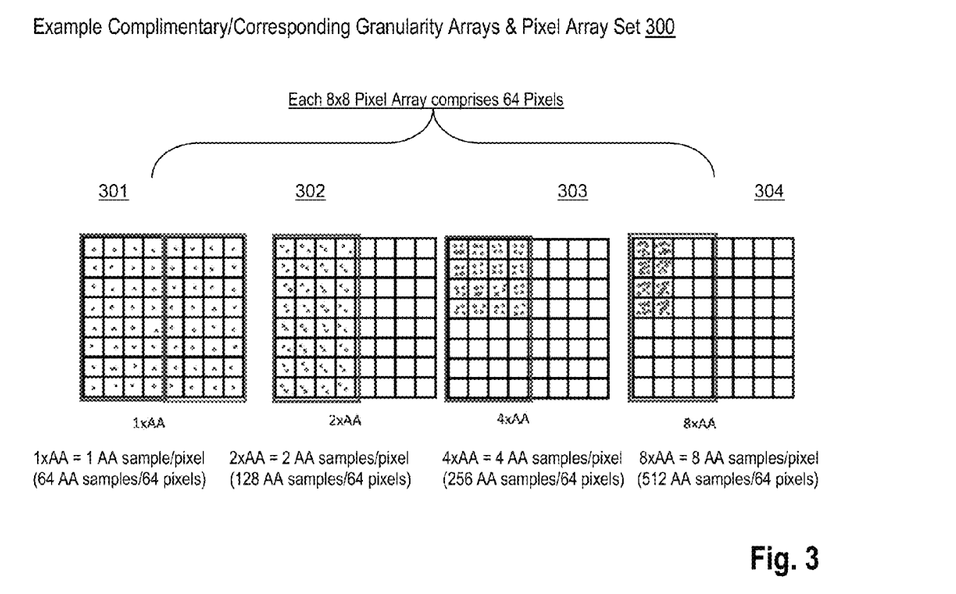
FIG. 3 depicts an example pixel array set, according to an embodiment of the present invention.

FIG. 3 depicts a set 300 of example corresponding arrays of pixels and anti-aliasing sampling granularities, according to an embodiment of the present invention. Example pixel array 301 depicts an 8×8 array of 64 total pixels at a 1×AA anti-aliasing granularity setting, wherein each of the 64 pixels has a single complimentary, corresponding anti-aliasing sample value stored in association therewith for a unitary granularity-to-pixel density.

Example pixel array 302 depicts the 8×8 array of 64 total pixels at a 2×AA anti-aliasing granularity setting, wherein each of 32 pixels, e.g., in the left half of the array of the 64 pixel array, each has two corresponding anti-aliasing sample values stored in association therewith; a 2:1 granularity-to-pixel density. Example pixel array 303 depicts the 8×8 array of 64 total pixels at a 4×AA anti-aliasing granularity setting, wherein each of 32 pixels, e.g., in the upper left quadrant of the array of the 64 pixel array, each has four corresponding anti-aliasing sample values stored in association therewith; a 4:1 granularity-to-pixel density.

Example pixel array 304 depicts the 8×8 array of 64 total pixels at an 8×AA anti-aliasing granularity setting, wherein each of 16 pixels, e.g., in the left half of the upper left quadrant of the 64 pixel array, each has eight corresponding anti-aliasing sample values stored in association therewith; an 8:1 granularity-to-pixel density. An example embodiment may be implemented wherein ZCULL 125 operates on 32 pixel granularity, while ZROP 120 operates on 64 sample granularity. In such a circumstance, ZROP 120 sends a single ZROP-ZCULL update 122 for 64 samples for the 2×AA, 4×AA and 8×AA pixel arrays (302, 303 and 304 respectively) corresponding to 32, 16 or 8 pixels, respectively. In 1×AA mode (pixel array 301) however, ZROP 120 doubles the number of ZROP-ZCULL updates 122, so that ZCULL 125 receives 2 updates for the 64 samples, corresponding to two (2), 32-pixel regions that constitute the ZCULL 125 granularity in this example. Similar adjustments of the ZROP-ZCULL update 122 rate are possible for other combinations of ZROP 120 and ZCULL 125 granularities.

An example embodiment may be implemented wherein the anti-aliasing data 188 may indicate to ZROP 120 that a model circumstance exists wherein, e.g., based on a surface characteristic representing an image object to be rendered therewith, the anti-aliasing granularity of a current group of pixels undergoing processing with pipeline 100 (FIG. 1) rises from the pixel-format compatible 1×AA granularity to a higher anti-aliasing granularity setting such as 2×AA, 4×AA or 8×AA granularities, etc., e.g., as may be (or become) feasible.

In an example embodiment of the present invention, a graphics rendering pipeline (e.g., pipeline 100; FIG. 1) and/or a related Z-Buffer control (e.g., control 200; FIG. 2) perform processing operations (e.g., methods, processes, electronically computed algorithms, heuristics, routines or programs, logical functions and physical transformations corresponding or related thereto). The processing operations relate to transacting data with a depth buffer. An example embodiment may be implemented wherein depth related graphics data are updated based on feedback relating to pixel granularity and, e.g., an anti-aliasing sampling granularity.

Example Computer

Figure 4:
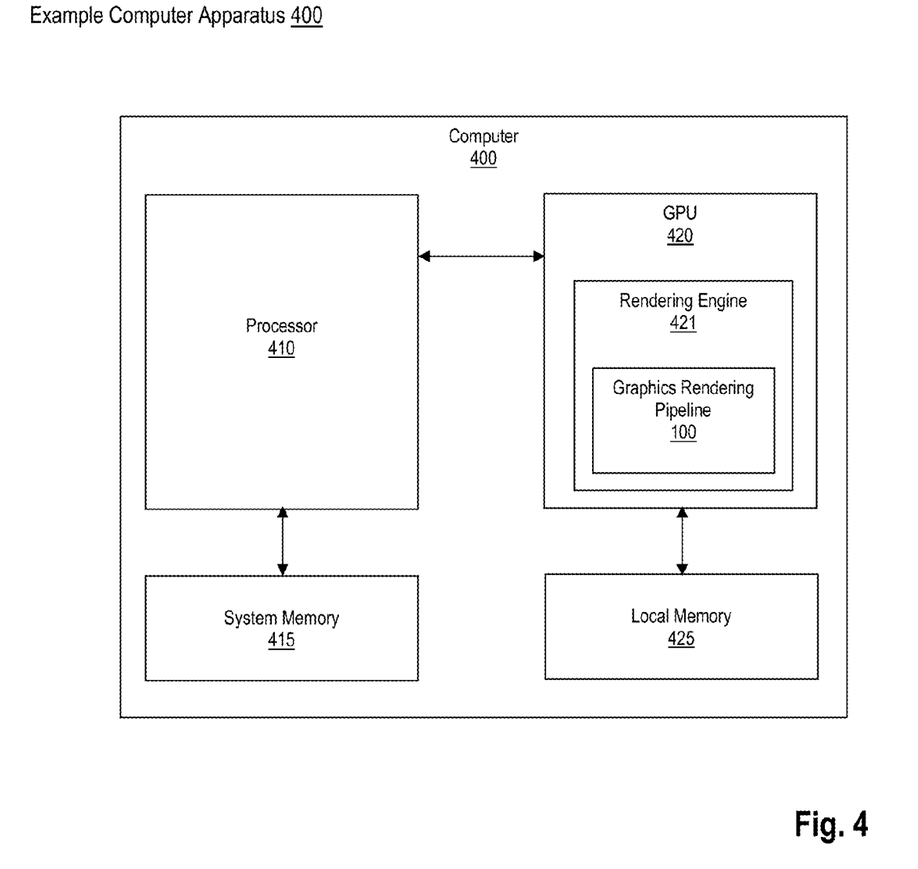
FIG. 4 depicts an example computer apparatus, according to an embodiment of the present invention.

FIG. 4 depicts an example computing apparatus (e.g., computer), according to an embodiment of the present invention. The computer 400 comprises a processor 410 and a system memory 415, which functions with the processor 410. The processor 410 may comprise a central processing unit (CPU) of the computer 400. The system memory 415 may comprise static and dynamic memory and/or storage media external thereto. The CPU 410 may be operable to function with a GPU 420.

The GPU 420 performs high speed computations relating to processing graphics and/or other data. The graphics processing performed with GPU 420 may be somewhat or significantly specialized, intensified, accelerated and/or more efficient, e.g., in relation to CPU 410 and/or its associated transactions with GPU 420. A local memory 425 functions with the GPU 420.

The GPU 420 comprises one or more rendering engines 421, each of which comprises at least one instance of the graphics rendering pipeline 100, which process data, as described above. Local memory 425 may comprise a frame buffer (e.g., frame buffer 160; FIG. 1, 2). The frame buffer and/or at least another portion of the local memory 425 comprise a depth buffer (e.g., Z-Buffer 199; FIG. 1, 2).

An example embodiment may be implemented wherein GPU 420, local memory 425, processor 410 and/or system memory 415 comprise, or are disposed in an integrated circuit (IC) chip. An example embodiment may be implemented wherein rendering engine 421 and/or graphics rendering pipeline 100 comprise hardware, software, firmware and/or combinations of hardware, software and/or firmware and are operable to perform a process for transacting data with a depth buffer, as described above.

Thus, example embodiments of the present invention are described in relation to rendering graphics data, including updating depth related graphics data. Geometric primitives are processed. Pixels are generated from the primitives based on the processing, each of which has at least one corresponding depth value. Culling is performed on a first group of the pixels, based on a representation of the at least one depth related value corresponding to each. Pixels may be discarded based on the culling and upon which a second group of pixels remain. A depth related raster operations function is performed, in which data is transacted with a depth buffer. The culling function is updated in relation to the transacting. The updating is performed on the basis of a granularity, which characterizes the culling function.

While the foregoing describes example embodiments of the present invention, other and further embodiments of the invention may be devised without departing from the basic scope thereof. Therefore, the scope of the present invention is determined by the claims that follow.

What is claimed is:

1. A method for rendering graphics data, the method comprising:
   processing one or more input geometric primitives,
   generating a plurality of pixels from the one or more input geometric primitives based on the processing, wherein each of the plurality of pixels has at least one depth value;
   performing a depth culling function in a pixel granularity on the plurality of pixels based on a representation of the at least one depth value corresponding to each of the plurality of pixels, wherein the performing the depth culling function comprises: discarding one or more first pixels of the plurality of pixels and retaining one or more second pixels of the plurality of pixels; and transacting data with a first depth buffer, wherein the transacting comprises updating the first depth buffer in the pixel granularity; and
   performing a depth raster operations function in a sample granularity that is different from the pixel granularity, wherein the performing the depth raster operations function comprises transacting data with a second depth buffer and updating the depth culling function in relation to the transacting, and wherein the updating is performed in the pixel granularity, and wherein the first depth buffer stores a logical instance of the second depth buffer and has a storage or sampling granularity that is less than that of the second depth buffer.

2. The method as recited in claim 1 wherein the first depth buffer is local to the depth culling function.

3. The method as recited in claim 2 wherein the second depth buffer is a portion of a frame buffer.

4. The method as recited in claim 2 wherein the first depth buffer comprises an approximation of the second depth buffer.

5. The method as recited in claim 4 wherein the approximation comprises a conservative approximation.

6. The method as recited in claim 1 wherein the sample granularity corresponds to an active anti-aliasing spatial sampling granularity that, based on processing thereof, characterizes a surface of the one or more input geometric primitives.

7. The method as recited in claim 6, further comprising:
   determining that the active anti-aliasing sampling granularity differs from the pixel granularity; and
   based upon the determining, changing a data rate associated with the active anti-aliasing sampling granularity, wherein the updating the depth culling function is performed with a changed data rate.

8. The method as recited in claim 1, further comprising one or more of:
   rasterizing pixels;
   performing a pre-raster operations function;
   shading pixels; or
   performing a color raster operations function.

9. A graphics processing unit (CPU) comprising:
   memory; and
   a graphics rendering pipeline, wherein the graphics rendering pipeline is configured to perform a method of rendering graphics data, the method comprising:
   processing one or more input geometric primitives;
   generating a plurality of pixels from the one or more input geometric primitives based on the processing, wherein each of the plurality of pixels has at least one depth value;
   performing a depth culling function, in a pixel granularity on the plurality of pixels based on a representation of the at least one depth value corresponding to each of the plurality of pixels, wherein the performing the depth culling function comprises: discarding one or more first pixels of the plurality of pixels and retaining one or more second pixels of the plurality of pixels; and transacting data with a first depth buffer, and wherein the transacting comprises updating the first depth buffer in the pixel granularity; and
   performing a depth raster operations function in a sample granularity that is different from the pixel granularity, wherein the performing the depth raster operations function comprises transacting data with a second depth buffer in the sample granularity and updating the depth culling function in relation to the transacting, and wherein the updating is performed in the pixel granularity, and wherein the first depth buffer stores a logical instance of the second depth buffer and has a storage or sampling granularity that is less than that of the second depth buffer.

10. The GPU as recited in claim 9 wherein the second depth buffer is a portion of a frame buffer and wherein the first depth buffer is local to the depth culling function.

11. The GPU as recited in claim 9 wherein the first depth buffer comprises an approximation of the second depth buffer.

12. The GPU as recited in claim 11 wherein the approximation comprises a conservative approximation.

13. The GPU as recited in claim 9 wherein the transacting data with the second depth buffer is performed based on the sample granularity, and wherein the sample granularity corresponds to an active anti-aliasing spatial sampling granularity that characterizes a surface of the one or more input geometric primitives.

14. The GPU as recited in claim 13, wherein the method further comprises:
   determining that the active anti-aliasing sampling granularity differs from the pixel granularity used by the depth culling function; and
   based upon the determining, changing a data rate associated with the active anti-aliasing sampling granularity, wherein the updating the depth culling function is performed with a changed data rate.

15. The GPU as recited in claim 9 wherein the method further comprises one or more of:
   rasterizing pixels;
   performing a pre-raster operations function;
   shading pixels; and
   performing a color raster operations function.

16. A computer apparatus comprising:
   a first processor;
   first memory coupled to the first processor;
   a graphics processing unit configured to perform high speed processing substantially independent of the first processor; and
   second memory comprising a frame buffer coupled to the graphics processing unit;
   wherein the graphics processing unit comprises a graphics rendering pipeline, and wherein the graphics rendering pipeline is configured to perform a method of rendering graphics data, the method comprising:
   generating a plurality of pixels from the one or more input geometric primitives, wherein each of the plurality of pixels has at least one depth value;
   performing a depth culling function in a pixel granularity on the plurality of pixels based on a representation of the at least one depth value corresponding to each of the plurality of pixels, wherein the performing the depth culling function comprises: discarding one or more first pixels of the plurality of pixels and retaining one or more second pixels of the plurality of pixels; and transacting data with a first depth buffer, and wherein the transacting comprises updating the first depth buffer in the pixel granularity; and
   performing a depth raster operations function in a sample granularity that is different from the pixel granularity, wherein the performing the depth raster operations function comprises transacting data with a second depth buffer and updating the depth culling function in relation to the transacting, and wherein the updating is performed in the pixel granularity, and wherein the first depth buffer stores a logical instance of the second depth buffer and has a storage or sampling granularity that is less than that of the second depth buffer.

* * * * *